United States Patent [19]

Barradas

[11] 4,142,094
[45] Feb. 27, 1979

[54] ELECTRICAL APPLIANCE

[76] Inventor: George Barradas, 15 Riverview Ct., Glenville, Conn. 06830

[21] Appl. No.: 806,174

[22] Filed: Jun. 13, 1977

[51] Int. Cl.² .................................................. H05B 1/00
[52] U.S. Cl. ............................ 219/524; 219/442; 219/386; 219/460; 99/422
[58] Field of Search ............... 219/385, 386, 438, 439, 219/441, 442, 443, 449, 460, 462, 524, 525; 99/375, 376, 422, 425, 446

[56] References Cited

U.S. PATENT DOCUMENTS

| 1,613,770 | 1/1927 | Reichold | 219/525 |
|---|---|---|---|
| 1,680,402 | 8/1928 | Vaughan | 219/524 X |
| 1,705,727 | 3/1929 | Forshee | 219/525 X |
| 2,644,880 | 7/1953 | Valentini et al. | 219/525 |
| 2,648,514 | 8/1953 | Rosier et al. | 219/443 X |
| 3,108,531 | 10/1963 | Jepson et al. | 219/524 X |
| 4,011,431 | 3/1977 | Levin | 219/524 |

FOREIGN PATENT DOCUMENTS

| 654037 | 12/1937 | Fed. Rep. of Germany | 219/441 |
|---|---|---|---|
| 304441 | 1/1933 | Italy | 219/525 |

Primary Examiner—Volodymyr Y. Mayewsky

[57] ABSTRACT

An electrical frying pan comprises a metallic cooking pan having a flat base against the undersurface of which there is held in close thermal contact a wire or foil type heating element by a body of thermally insulating material disposed above a metal plate. A fastening bolt secured centrally to the base of the pan extends downwardly through the metal plate and the insulation thereabove, then receives a first nut to hold the various parts in their assembled positions, then extends downwardly through a base housing and then receives a second nut to secure the cooking pan to the base housing. A handle is usefully integrally formed with the base housing to extend outwardly therefrom and a mating cover can also be provided.

11 Claims, 3 Drawing Figures

4,142,094

ELECTRICAL APPLIANCE

BACKGROUND OF THE INVENTION

The present invention relates generally to small domestic electrical appliances and more particularly to electrical frying pan type appliances.

A wide variety of electrical frying pan type appliances have heretofore been produced. Some of the known devices have been intended for general frying purposes while others have been provided for somewhat special or esoteric cooking applications, such as the simultaneous cooking of a food product, for example, a waffle, on both its sides.

The previously known electrical frying pan type appliances have, however, presented certain practical disadvantages. For instance, many of the specialty type appliances have offered only limited utility for general cooking purposes while those appliances specifically constructed for use in the general frying of food have been relatively complex in their construction and consequently relatively expensive to manufacture or to purchase.

It is a principal object of this invention to provide an electrical frying pan type appliance intended for general frying purposes and which presents several important practical advantages when compared to such appliances as presently available.

More particularly, it is an object of this invention to provide an electrical frying pan type appliance which is relatively simple in its construction and which can, therefore, be constructed and marketed at a relatively low cost.

Other objects of the invention will become apparent as the description herein proceeds.

SUMMARY OF THE INVENTION

An electrical frying pan type appliance in accordance with this invention can broadly be defined as comprising a base housing having an upstanding peripheral wall with a top edge; a handle extending outwardly from said base housing; a cooking pan having a base and an upstanding peripheral wall integrally formed with said base and, around its top edge, with a peripheral flange supported over said top edge of said peripheral wall of said base housing; an electrical heating element disposed below said base of said cooking pan; a body of thermally insulating material disposed below said electrical heating element, extending essentially completely across the full area of said base of said cooking pan and effectively secured thereto to maintain said electrical heating element in thermal contact with said cooking pan; and a fastener securing said cooking pan to said base housing.

An electrical frying pan type appliance in accordance with the present invention is usefully constructed using a low cost wire type heating element so providing for economy in manufacture, particularly when compared to the known use of heating elements which are embedded directly in a cast metal cooking pan. It has further been found that such use of low cost wire type heating elements is possible even with the requirement of relatively uniform and even heat distribution over the base surface of the cooking pan of such an appliance.

An electrical frying pan type appliance in accordance with this invention is usefully also provided with a lid or cover which is, in turn, usefully formed with a handle extending outwardly for mating disposition with the handle extending from the base housing.

Other features of the invention and the advantages presented thereby will become apparent as the description herein proceeds.

BRIEF DESCRIPTION OF THE DRAWINGS

The invention will now be described in greater detail but merely by way of illustration with reference to the preferred embodiment thereof as shown in the accompanying drawings in which.

DESCRIPTION OF THE PREFERRED EMBODIMENT

There is indicated generally at 10 in the accompanying drawings one embodiment of an electrical frying pan type appliance. The appliance 10 comprises a base housing generally indicated at 12 and provided with a two-part outwardly extending base handle generally indicated at 14, a cooking pan generally indicated at 16, and a cover generally indicated at 18 and provided with an outwardly extending cover handle generally indicated at 20.

Figure 1:
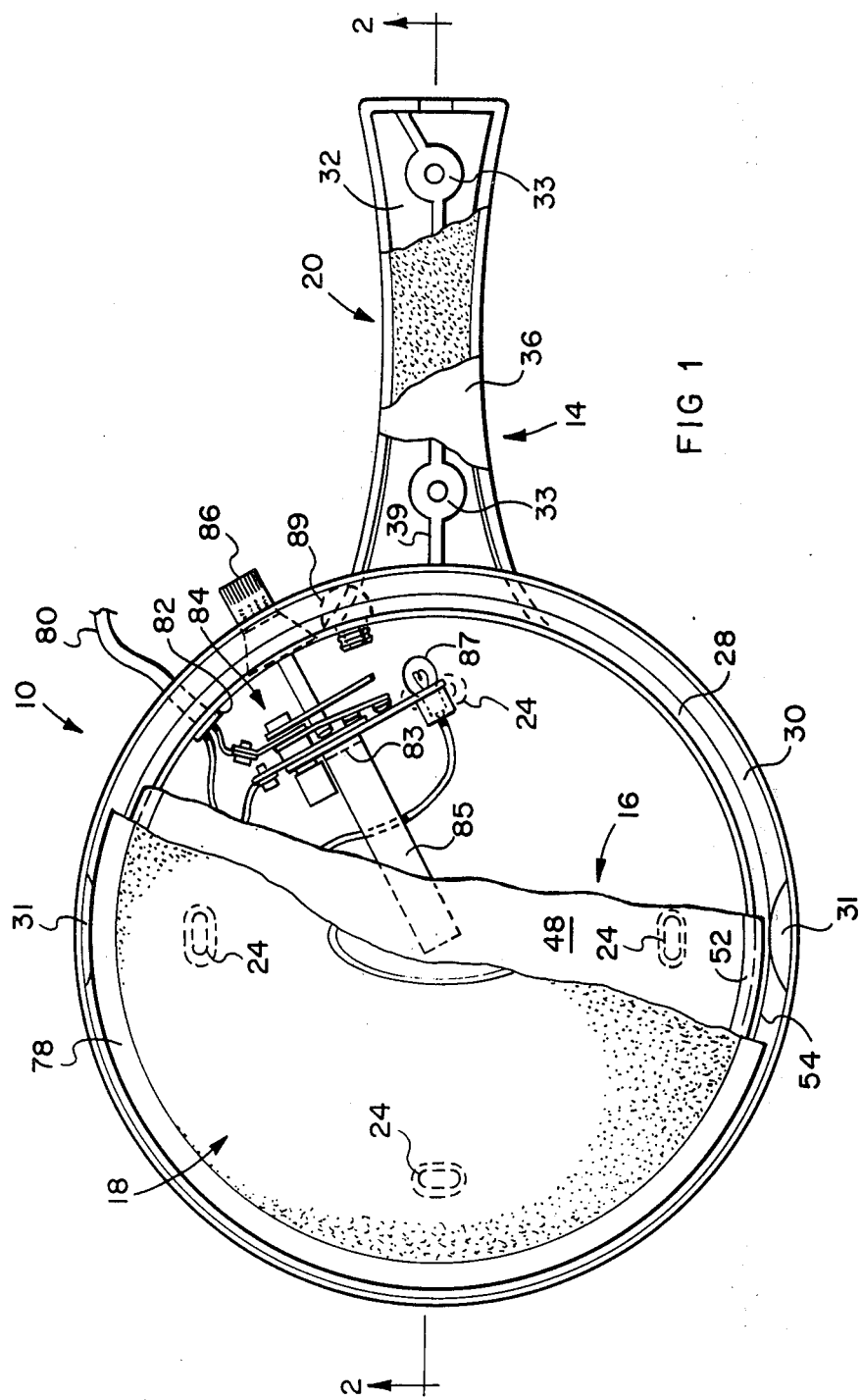
FIG. 1 is a plan view from above with certain parts shown fragmentarily and others omitted of one embodiment of an electrical frying pan type appliance in accordance with this invention.

The base housing 12 comprises a base 22 formed with four legs 24 (shown in phantom outline in FIG. 1) and an upstanding peripheral wall 26 which is itself integrally formed with an outwardly projecting flange 28 and an outwardly and downwardly sloping peripheral lip 30 in which two pouring spouts 31 are formed. The flange also prevents liquid from pouring down into the electrical parts.

Figure 2:
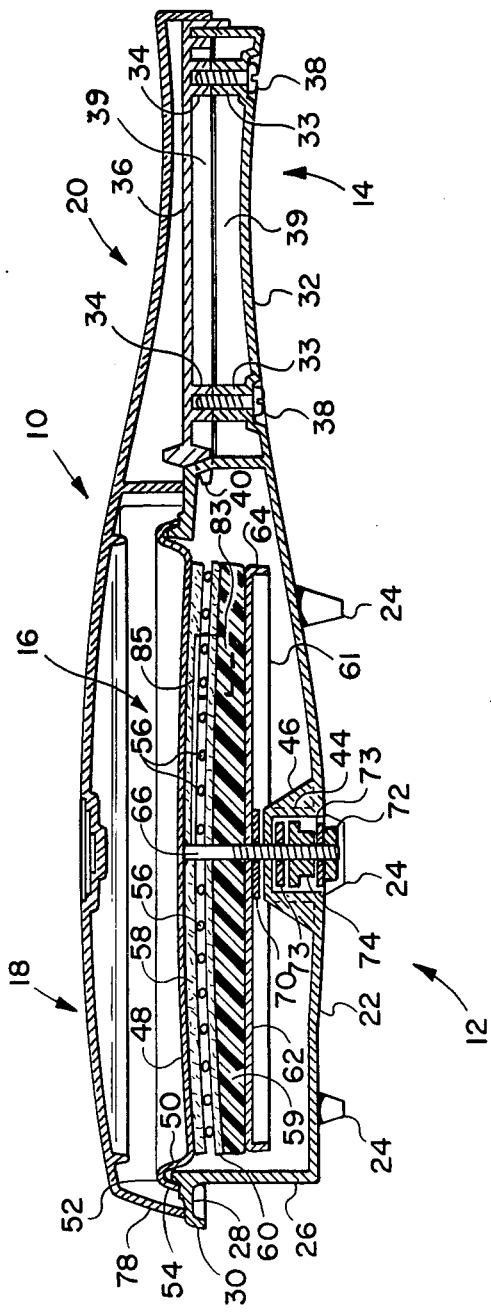
FIG. 2 is a vertical sectional view through the appliance shown in FIG. 1 when taken as indicated by the arrows 2—2 of that figure.
Figure 3:
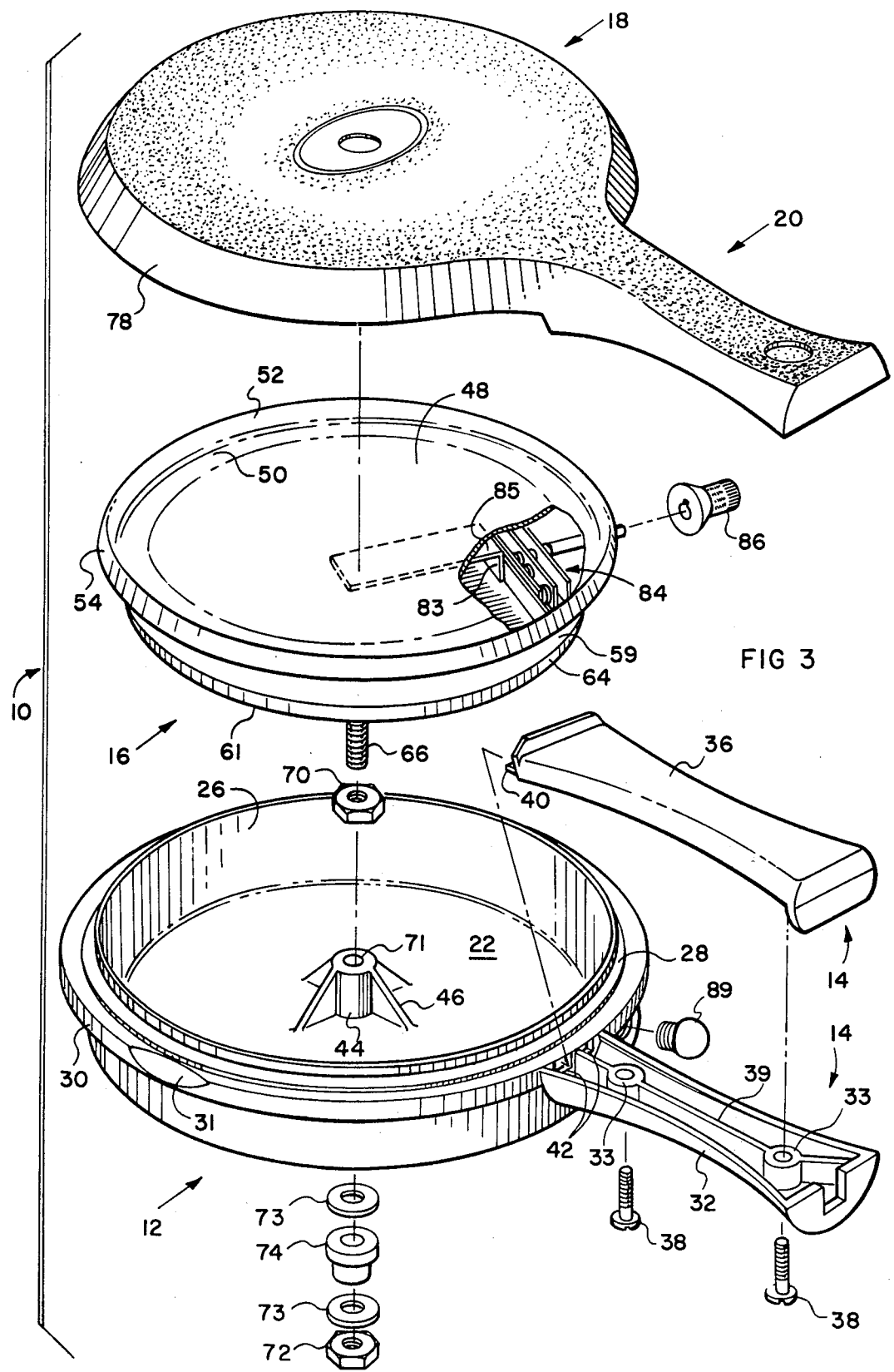
FIG. 3 is an exploded and fragmentary perspective view of the appliance shown in the preceding figures.

As will best be seen by reference to FIGS. 2 and 3, the base handle 14 comprises a generally hollow lower part 12 integrally formed with the base 22 and the peripheral wall 26 of the base housing 12 and provided with two hollow bosses 33 receiving bolts 38 screwed into corresponding threaded bosses 34 in an upper part 36 of the base handle 14. Reinforcing ribs 38 are usefully formed in the handle parts 32 and 36.

At its inner end, the upper part 36 of the base handle 14 is formed with two tongues 40 which are received in openings 42 provided in the peripheral wall 26 of the base housing 12.

An upstanding sleeve or boss 44 is integrally formed with the base 22 of the base housing 12 for a purpose still to be described and that boss 44 is reinforced by ribs 46.

The cooking pan 16 comprises a base 48 integrally formed with a peripheral wall 50 which is, in turn, integrally formed with a peripheral flange 52 and a downwardly and outwardly projecting peripheral lip 54, that lip 54 being supported on the aforementioned peripheral flange 28 of the base housing 12.

Below the base 48 of the cooking pan 16, there is disposed a low cost insulated wire type heating element 56 (FIG 2) which is electrically insulated from the pan base 48 by a mica sheet 58. Below the element 56, there is provided a relatively rigid sheet 60 of thermally insulating material such as asbestos below which there is provided a relatively thick pad 59 of thermally insulating material such as glass fibre, which is in turn retained in position by an inverted metal pan 61 having a base 62 and a depending peripheral reinforcing wall 64. It is to be noted that the pad 60 extends substantially across the full area of the base 48 of the cooking pan 16 and that the components indicated by the legends 56, 59, 60 and 62 are omitted from FIG. 1 so as to simplify that figure.

Secured generally centrally to the base 48 of the cooking pan 16 and depending therefrom through the sheet 60, insulating material 59 and pan base 62 is a threaded bolt 66.

A nut 70 screwed on the bolt 66 below the pan base 62 serves to hold the heating element 56 and the insulating material 59 and 60 in their assembled positions.

The bolt 66 extends downwardly through an opening 71 in the boss 44 and a nut 72 screwed onto that bolt 66 secures the cooking pan 16 in position in the base housing 12. Two washers 73 and a hard rubber bushing 74 are disposed within the boss 44 to compensate for thermal expansion effects.

The cover 18 is integrally formed with a downwardly depending peripheral wall 78 having a bottom edge which rests on the aforementioned peripheral flange 28 of the base housing 12 outwardly of the lip 54 of the cooking pan 16 and which, as already indicated, is integrally formed with a cover handle 20 for mating disposition with the base handle 14 as will readily be understood by reference to the drawings.

Electrical power is supplied to the heating element 56 by an electrical supply cord indicated fragmentarily at 80 and which extends inwardly through a suitable bushing 82 in the peripheral wall 26 of the base housing 12 to a thermostatic control of conventional construction and generally indicated at 84. The control 84 is usefully mounted on an end flange 83 of a radially disposed metal strap 85 which is clamped in position against the undersurface of the base 48 of the cooking pan 16 (i.e. upwardly of the mica sheet 58), the bolt 66 extending through an opening in the inner end of the strap 85 which serves as a heat transfer means between the pan base 48 and the thermostatic control 84 to minimize thermostat response delay. Optionally, a pilot light 87 (shown only in FIG. 1) is mounted on the control 84 and is visible through a transparent lens 89 screwed into the side wall 26 of the base housing 12 to indicate when power is being supplied to the element 56. Usefully, the thermostatic control 84 is provided with a manual adjustment knob 86 by the adjustment of which the operating temperature of the appliance 10 can be adjusted as will readily be understood by those conversant with the design of small electrical domestic appliances. It will also be understood that the electrical supply cord 80 can enter the appliance at any convenient position. It is, for example, possible to position the cord within the base handle 14.

Having completed the description herein of the construction of the appliance 10, the manner in which that appliance is assembled from its component parts will now briefly be summarized. For such an assembly operation, the strap 85 carrying the thermostatic control 84, the mica sheet 58, the heating element 56, asbestos sheet 60, insulating pad 59 and pan 61 are placed in position on the bolt 66 projecting from the undersurface of the base 48 of the cooking pan 16. The nut 70 is then screwed on the bolt 66 to maintain those components in their assembled positions. The cooking pan 16 is then placed in position in the base housing 12, after the necessary electrical connections have been made, and that pan is then secured in position in the base housing 12 using the washers 73, bushing 74 and nut 72.

Assembly of the basic unit is completed by inserting the tongues 40 of the upper base handle part 36 into the openings 42 and attachment of that upper base handle part 36 to the lower base handle part 32 by the bolts 38.

It will further be understood that no assembly is involved for the cover 18 since that part is a separate and removable part of the appliance 10.

For use of the appliance 10, the supply cord 80 is connected to an appropriate electrical receptacle and the control knob 86 of the thermostat 84 is adjusted to provide a desired operating temperature. The food is then cooked in the pan 16 with cooking oil or fat, if necessary, the cover or lid 18 being used, if desired, in a conventional manner.

It is believed that, from the foregoing description, the relative simplicity and inexpensive construction of an electrical frying pan type appliance in accordance with this invention will be readily apparant.

What is claimed is:

1. An electrical frying pan type appliance which comprises;
    a base housing having an upstanding peripheral wall with a top edge;
    a handle extending outwardly from said base housing;
    a cooking pan having a base and an upstanding peripheral wall integrally formed with said base and around its top edge with a peripheral flange supported over said top edge of said peripheral wall of said base housing;
    heat resistant electrical insulating means in contact with and below said base of said cooking pan;
    electrical heating element means below and in contact with said electrical insulating means;
    a body of thermally insulating material below and in contact with said electrical heating element means;
    supporting means supporting said body of thermally insulating material in contact with said heating element means, and means fastening said supporting means in position, whereby to maintain said heating element means in contact with said electrical insulating means, thereby insuring direct conduction of heat from said heating element means to said cooking pan;
    fastening means for fastening said cooking pan to said base, and,
    resilient means associated therewith for permitting relative movement due to thermal expansion.

2. An electrical frying pan type appliance as claimed in claim 1 wherein said fastening means comprises a stud attached to said cooking pan, and extending through an opening in said base, and said resilient means comprises at least one washer of resilient material around said stud, and a fastening member connected to said stud, and retaining said washer thereon.

3. An electrical frying pan type appliance as claimed in claim 2 including an upwardly extending sleeve member formed in said base, and wherein said opening is located in said sleeve member, whereby said stud may extend from said cooking pan through said opening into said sleeve member, and wherein said at least one resilient washer and said fastening member are located within said sleeve member.

4. An electrical frying pan type appliance which comprises:

a base housing having an upstanding peripheral wall with a top edge;
a handle extending outwardly from said base housing;
a cooking pan having a base and an upstanding peripheral wall integrally formed with said base and, around its top edge, with a peripheral flange supported over said top edge of peripheral wall of said base housing;
a thin sheet of heat resistant electrical insulating material contacting said base and substantially co-extensive therewith;
an electrical heating element disposed below said base of said cooking pan in contact with said sheet of electrical insulating material whereby to provide overall heating of said base through said sheet, and being substantially co-extensive with said sheet, said element being connectable with a source of electrical power;
a sheet of asbestos heat resistant material below said heating element in contact therewith;
a thick pad of glass fibre thermally insulating material disposed below said asbestos sheet, extending essentially completely across the full area of said base of said cooking pan;
a substantially rigid plate member below said glass fibre pad, and co-extensive therewith;
fastening means extending from said base of said pan through said electrical insulation sheet, said heating element, said asbestos sheet, said glass fibre pad and said rigid plate and fastening same in position in contact with one another in the manner aforesaid to maintain said electrical insulating sheet and said heating element in thermal contact with said cooking pan; and
a fastener securing said cooking pan to said base housing.

5. An electrical frying pan type appliance as claimed in claim 4 and which additionally comprises a cover dimensioned to mate with said base housing and provided with a handle extending outwardly therefrom for mating disposition with said handle extending outwardly from said base housing.

6. An electrical frying pan type appliance as claimed in claim 4 and in which said cooking pan has integrally formed therewith a peripheral lip extending outwardly and downwardly from said peripheral flange thereof.

7. An electrical frying pan type appliance as claimed in claim 4 wherein said fastening means comprises a generally central stud secured to said base of said cooking pan and depending therefrom through said electrical insulating sheet, said heating element, said asbestos sheet, said glass fiber pad of thermally insulating material and said rigid plate and by an abutment member disposed about said stud below said rigid plate.

8. An electrical frying pan type appliance as claimed in claim 7 and in which said fastener comprises a nut disposed below said base housing and threaded onto said stud.

9. An electrical frying pan type appliance as claimed in claim 8 and in which said abutment member comprises a nut screwed onto said stud between said base housing and said rigid plate.

10. An electrical frying pan type appliance as claimed in claim 4 wherein the said base housing and said handle are integrally molded in one piece of thermo plastic material, said handle defining an upwardly open portion, and including an upper handle part fitting over said upwardly open portion, and fastening means securing the same thereto.

11. An electrical frying pan type appliance as claimed in claim 4 including thermo sensitive means connected to said cooking pan, and thermo sensitive switch means responsive thereto, for controlling supply of electrical power to said heating element, and, manually adjustable control means connected to said switch means for adjustably setting the same at a desired temperature.

* * * * *